No. 755,226. PATENTED MAR. 22, 1904.
N. F. GRAVES.
MOWING MACHINE.
APPLICATION FILED JULY 27, 1903.
NO MODEL. 2 SHEETS—SHEET 1.
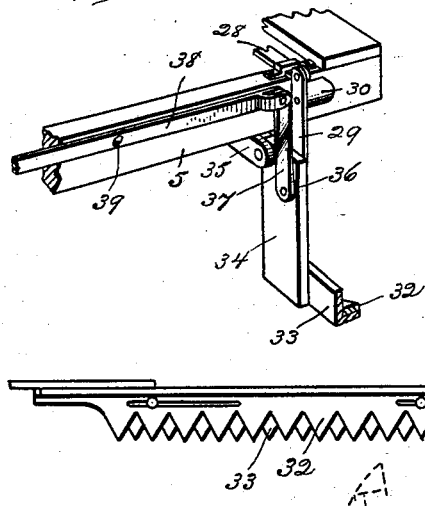
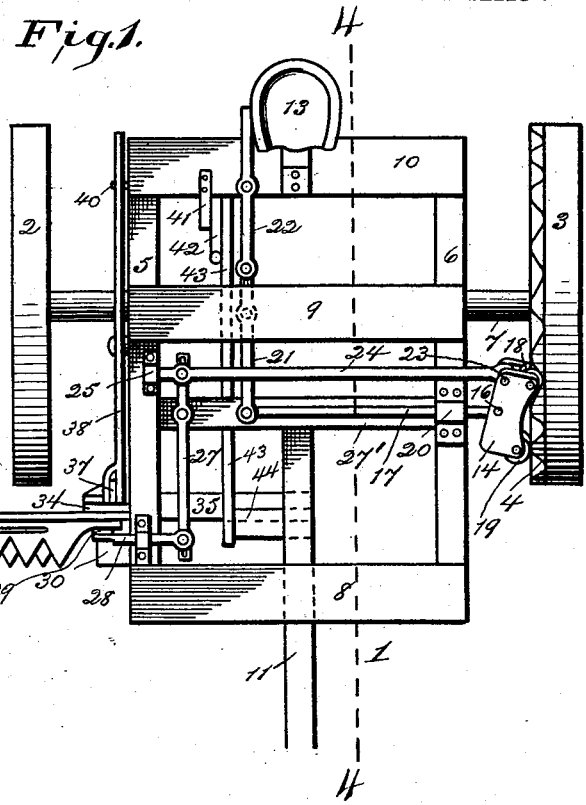
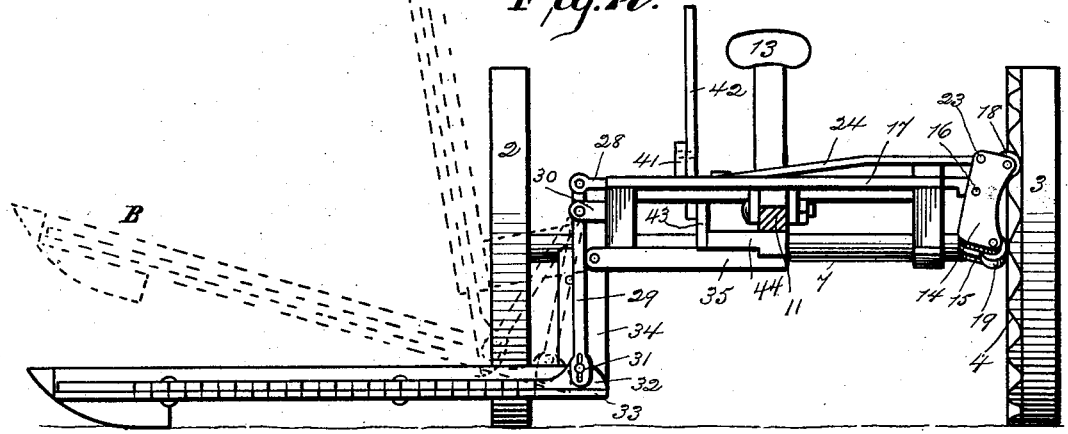
WITNESSES:
INVENTOR
Norman F. Graves,
BY
O. E. Duffy & Son
Attorneys

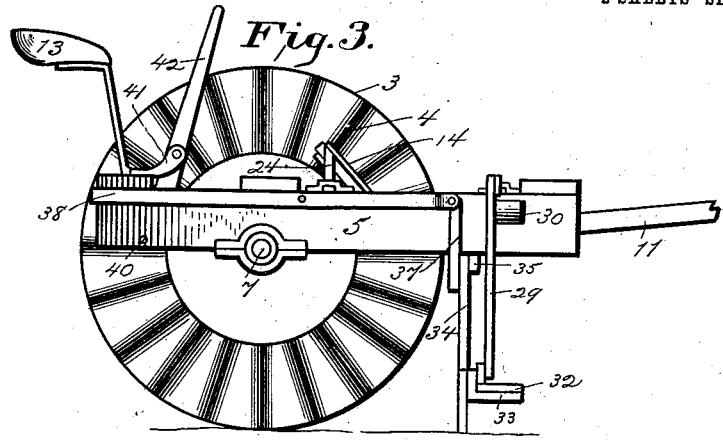
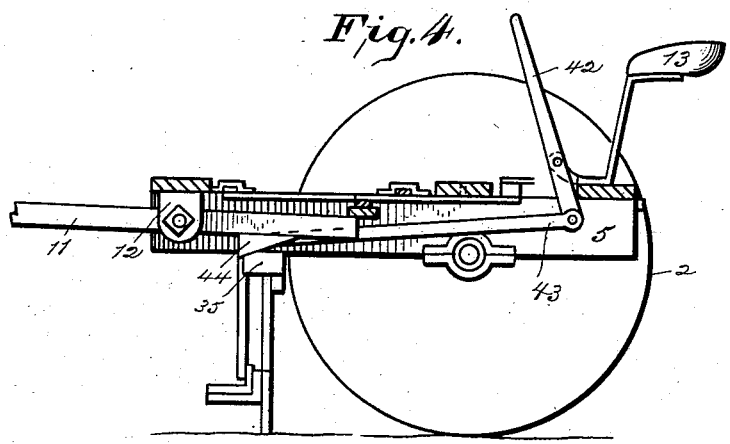
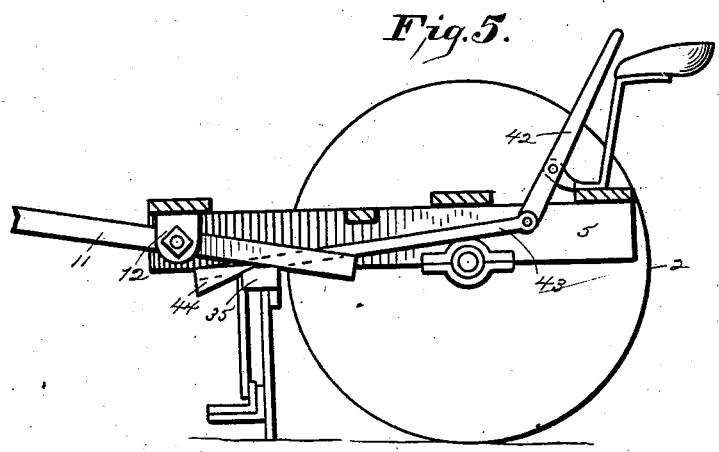

No. 755,226. Patented March 22, 1904.

UNITED STATES PATENT OFFICE.

NORMAN F. GRAVES, OF ALMA, ILLINOIS.

MOWING-MACHINE.

SPECIFICATION forming part of Letters Patent No. 755,226, dated March 22, 1904.

Application filed July 27, 1903. Serial No. 167,203. (No model.)

*To all whom it may concern:*

Be it known that I, NORMAN F. GRAVES, a citizen of the United States, residing at Alma, in the county of Marion and State of Illinois, have invented certain new and useful Improvements in Mowing-Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to mowers and reapers, and has for its object to provide a device of this class which is particularly simple in its construction, easy and positive of operation.

A further object of my invention is to provide a mower having a reciprocating cutter-bar which can be raised into substantially a vertical position and which can be reciprocated when carried out of a horizontal position, as would be necessary when cutting from a slight hill or rise in the ground.

A further object of my invention is to provide a novel means for raising or lowering the cutting apparatus while in a horizontal position.

With these and other objects in view my invention consists in the novel means of connecting and operating the cutting apparatus.

My invention also consists in the novel means of adjusting the height of the cutting apparatus.

My invention also consists in certain other novel features of construction and in combination of parts, which will be first fully described and afterward specifically pointed out in the appended claims.

Referring to the accompanying drawings, Figure 1 is a plan view of my invention. Fig. 2 is a front elevation of the same. Fig. 3 is a side elevation with one wheel removed. Fig. 4 is a longitudinal vertical section on line 4 4 of Fig. 1. Fig. 5 is a like view showing manner of adjusting the height of cutting apparatus. Fig. 6 is a detailed perspective view of the connections between the cutter-bar and the body of the machine.

Like characters of reference indicate the same parts throughout the several figures, in which—

1 is the mower, having the wheels 2 and 3, said wheel 3 being corrugated at 4, as shown in Figs. 1, 2, and 3.

5 and 6 indicate the main longitudinal frame-pieces, to which the axle 7 is secured.

8, 9, and 10 indicate the transverse frame-pieces secured to said longitudinal frame-pieces.

11 indicates the tongue secured in the clip 12 under the frame-piece 8, and 13 is the driver's seat secured to frame-piece 10.

14 and 15 indicate two rocking levers fulcrumed at 16 to the rod 17 and carrying the small rollers 18 and 19 between the said levers. Said rod 17 passes through a guide 20, secured to the frame-piece 6, and said rod is connected at its inner end to a lever 21, to which lever is secured an operating-lever 22, fulcrumed on the frame-piece 10. Secured to said rocking levers 14 and 15 at 23 is a rod 24, which passes into a guide 25, secured to frame-piece 5, and connected to said rod at 26 is a rocking lever 27, fulcrumed on brace-piece 27'. Pivoted to said rocking lever is a link 28, which connects with a vertical rocking lever 29, fulcrumed to the bracket 30, secured to the side of the frame-piece 5. Connected to the bottom of said vertical rocking lever at 31 is the reciprocating cutter 32, suitably secured to the finger-bar 33, so as to be capable of a reciprocating movement. Said finger-bar 33 is rigidly secured to an arm 34, substantially at right angles thereto, said arm being pivoted to a bracket 35 under the frame piece 5, Fig. 6, and pivoted to said arm at 36 is a link 37, pivoted at its upper end to operating-lever 38, fulcrumed at 39 to frame-piece 5, said lever extending rearwardly, so as to be capable of operation by the foot of the driver. A projection 40 or other suitable holding means on the frame-piece 5 is employed to hold said lever depressed.

Secured to a bracket 41 at rear of machine is a vertical operating-lever 42, to which is pivoted a rod 43, Figs. 4 and 5, and secured to the forward end of said rod and extending therefrom is a wedge member 44, adapted to operate between the tongue 4 and the bracket-piece 35.

Having thus set forth the several parts of my invention, its operation is as follows: When the operating-lever 22 is in position shown in Fig. 1, the rollers 18 and 19 between the rocking levers 14 and 15 are in engagement with the corrugations 4 on the wheel 3. By moving said lever away from the seat 13 the said rocking levers and rollers are carried out of engagement with the wheel 3 by reason of said lever 22 acting upon lever 21 and rod 17. This throws the cutting apparatus out of connection with the driving-wheel 3 and stops the reciprocating of the cutter-bar, which is operated by said rod 24 rocking the horizontal lever 27 and the vertical lever 29, said lever acting directly upon the cutting-bar.

In order to carry the cutter apparatus up out of position, as shown at A in dotted lines in Fig. 2, the lever 38 is depressed by the foot of the driver and carried down under the stop 40. This raises the forward end of said lever and swings the arm 34 up on its pivot, as shown in dotted lines in Fig. 2. Should, however, occasion require the cutting apparatus to be raised into the position shown in dotted lines at B in Fig. 2 or in any intermediate position, the lever 38 is depressed with the foot of the driver and held in the desired position, or I could employ suitable stops for holding said lever at different points, and it will be noted that the cutting apparatus will continue to operate when in said raised position, whereby it is possible to operate the machine on a hill or to adapt the cutting apparatus to any rises or unevenness in the land.

In order to adjust the distance of the cutting apparatus from the ground, so that the machine can cut different lengths, I employ the lever 42 to operate the wedge member 44 between the tongue 11 and the bracket 35, as shown in Figs. 4 and 5.

Having thus fully described my invention, I do not wish to be understood as limiting myself to the exact construction herein set forth, as various slight changes could be made therein by those skilled in the art which would fall within the limit and scope of my invention, and I consider myself clearly entitled to all such changes and modifications.

What I claim as my invention, and desire to secure by Letters Patent of the United States, is—

1. In a mower, the combination of a body, a cutting apparatus, an arm secured to said cutting apparatus and pivoted to said body, a driving-wheel having its inner face provided with a series of corrugations, a rocking lever adapted to be rocked by said corrugations, a rod carrying said rocking lever, and means for moving said rod and rocking lever out of engagement with said corrugations, a reciprocating rod secured to said rocking lever adapted to to be reciprocated thereby, a vertical rocking lever connected to said cutting apparatus and adapted to be rocked by said reciprocating rod through intermediate connections, and means for swinging said cutting apparatus and arm up upon the pivot of said arm.

2. In a mower, the combination of a body, a cutting apparatus, an arm secured to said cutting apparatus and pivoted to said body at a point considerably above said cutting apparatus, a rocking lever fulcrumed above said pivotal point of said arm, and means for rocking said rocking lever, a link pivoted to said arm, an operating-lever connected to said link, the whole arranged whereby said arm and cutting apparatus are swung up on the pivot of said arm by said operating-lever, and the cutting apparatus operated by said rocking lever when said cutting apparatus is in a position raised above the horizontal.

3. In a mower, the combination of a body, a cutting apparatus secured thereto, means for operating said cutting apparatus, a tongue pivoted to said body, a wedge member and rod for carrying the same, and means for moving said rod to drive said wedge under said tongue to raise the after end thereof.

In testimony whereof I affix my signature in presence of two witnesses.

NORMAN F. GRAVES.

Witnesses:
D. D. HAYNIE,
B. F. FARTHING.